United States Patent Office 3,568,460
Patented Mar. 9, 1971

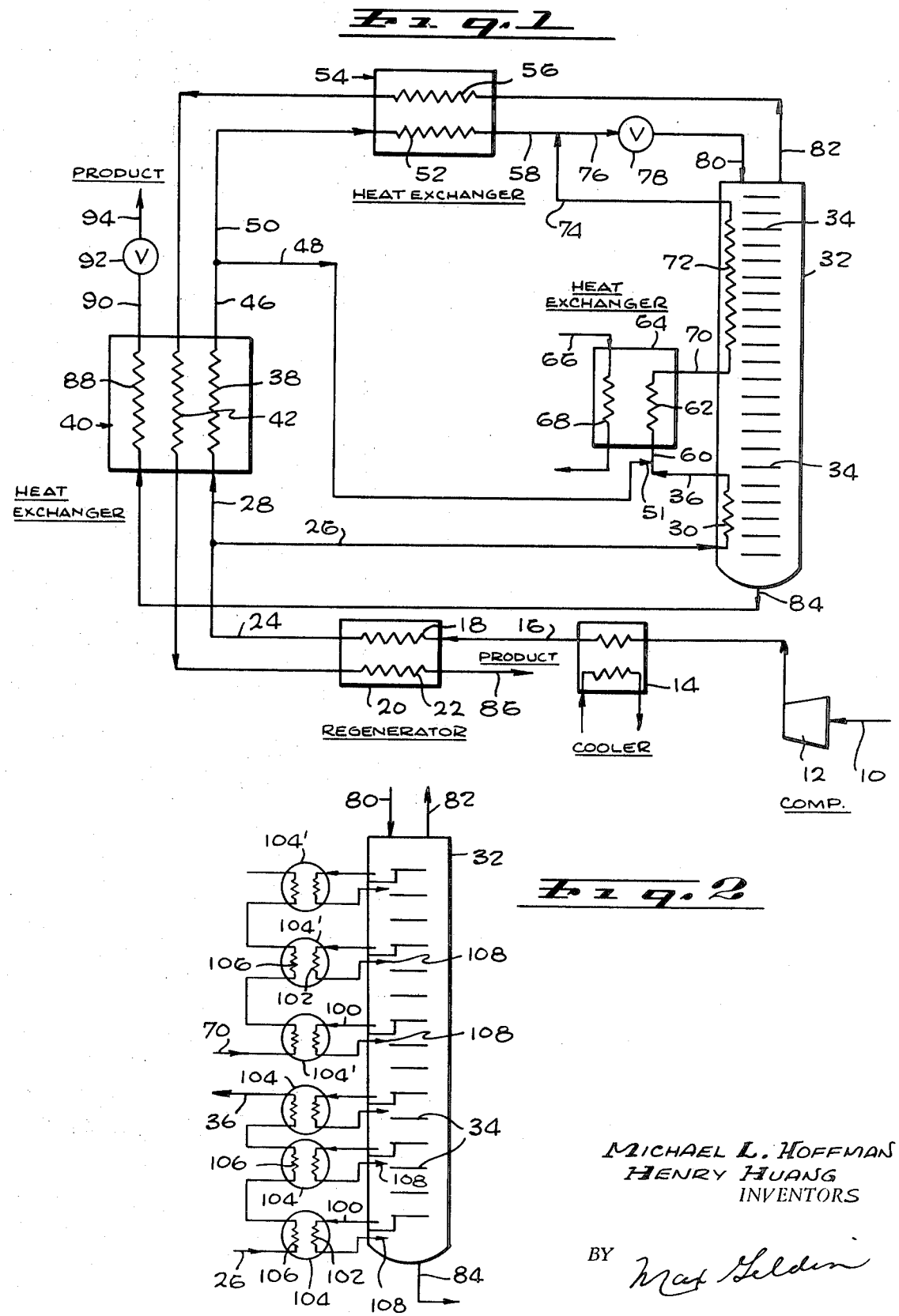

3,568,460
SEPARATION OF GAS MIXTURES BY FRACTIONATION WITH INDIRECT HEAT EXCHANGE
Michael L. Hoffman, Los Angeles, and Henry Huang, Inglewood, Calif., assignors to McDonnell Douglas Corporation, Santa Monica, Calif.
Filed Nov. 4, 1968, Ser. No. 772,898
Int. Cl. F25j 3/02
U.S. Cl. 62—34                                    19 Claims

ABSTRACT OF THE DISCLOSURE

Method and system for separating components of gas mixtures such as mixtures of hydrocarbons containing from 1 to about 4 carbon atoms, and particularly designed for recovery of hydrocarbons heavier, i.e., of higher molecular weight, than methane from natural gas containing a major proportion of methane and a minor proportion of ethane and which may also contain small amounts of propane, and other heavier hydrocarbons, which involves, according to one embodiment, cooling a compressed feed mixture of such natural gas, dividing the cooled compressed feed mixture into a first portion and a remaining portion, and passing the first portion of such cooled compressed feed mixture in heat exchange relation along the lower portion of a distillation column to further cool the first portion of the feed mixture and supply reboil heat to the lower portion of the column. Such further cooled first portion of the feed mixture is withdrawn from heat exchange relation with the column, is additionally cooled by external refrigeration and such additionally cooled first portion of the feed mixture is passed in heat exchange relation along the upper portion of the distillation column to further cool the last-mentioned portion of the feed mixture and providing reboil heat in the upper portion of the column. The remaining portion of the cooled compressed feed mixture is further cooled and combined with the cooled portion of feed mixture in liquid form withdrawn from heat exchange relation with the upper portion of the column, and the resulting combined cooled feed mixture is introduced into the top of the column as feed for the column. A separation of the feed mixture in the column is effected by a non-adiabatic distillation in the column, and a liquid bottoms product is withdrawn consisting essentially of substantially pure ethane and an overhead product consisting essentially of methane is obtained, which is used to cool the above-noted remaining portion of the feed mixture. This process and system are designed to effect an efficient separation for high recovery of ethane from the above-noted natural gas by removing refrigeration from the column along the length of the column in an efficient substantially thermodynamically reversible manner, that is, non-adiabatically, resulting in a substantial reduction in power requirement.

This invention relates to the separation of components of gas mixtures having different boiling points, such as the components of hydrocarbon mixtures containing hydrocarbons of from 1 to about 4 carbon atoms, particularly natural gas mixtures containing methane, ethane, and in some cases small amounts of propane and heavier hydrocarbons, and is especially concerned with a procedure and a system for the high recovery of ethane from natural gas mixtures containing a major proportion of methane and a minor proportion of ethane, employing non-adiabatic distillation in the column and employing column refrigeration to permit useful cooling of the feed mixture by heat exchange with the column contents, and thus substantially reducing the power requirement for the separation.

In most natural gas mixtures there are appreciable amounts of hydrocarbons of higher molecular weight than methane, the major constituent usually present in natural gas. It is usually desirable to remove these hydrocarbons as liquids and to market them separately since in general they have greater value as separate components than as constituents of natural gas.

In the case of the heaviest components such as pentane and higher molecular weight hydrocarbons, removal thereof may be accomplished by fractional cooling and collecting of the respective condensates. In the case of hydrocarbons having molecular weight between methane and pentane, that is, methane, ethane, propane and butane, a more complicated processing procedure is generally required. Among the processes generally used for separation of the latter components from natural gas is low temperature fractional distillation of the natural gas.

In conventional processes for such low temperature fractional distillation, the usual adiabatic distillation generally is employed, involving the mixing of hot and cold liquids or vapors in the column with high temperature differences between the various components. Due to the fact that there is a very large temperature difference between the boiling point of methane and other hydrocarbons such as ethane and propane, adiabatic distillation results in large thermodynamic irreversibilities within the distillation column and consequently poor thermodynamic efficiency.

The present invention is a substantial improvement over the above-noted prior art processes in that the invention process involves the recovery and removal of refrigeration from the column along the length thereof, and utilizing such refrigeration for cooling of the major portion of the natural gas feed mixture, with only a minor amount of external refrigeration required, to sufficiently cool the natural gas feed mixture to a temperature permitting it to be introduced as liquid feed into the top of the column. The passage of a major portion of the feed mixture in heat exchange relation along or through the column to abstract heat and provide reboil for the column incrementally along its length effects a non-adiabatic distillation in the column according to the invention process. The result is an efficient utilization of refrigeration from the column and a high recovery of substantially pure ethane in liquid form from the natural gas feed, resulting in a substantial reduction in the power requirement and cost of operation.

For efficiently carrying out the process according to the invention, a minor portion of the feed mixture is divided out and cooled in countercurrent heat exchange relation with cold overhead hydrocarbon vapors such as methane vapors from the distillation column, and is recombined with the major portion of the cooled feed mixture withdrawn from heat exchange relation with the column, the so-called combined feed mixture then being introduced into the top of the column as noted above.

Thus there is provided according to the invention a process and system for separating the components of a gas mixture, particularly a mixture of hydrocarbons containing from 1 to about 4 carbon atoms, having different boiling points, by low temperature rectification, to produce a bottoms product consisting essentially of the highest boiling point components of said mixture and an overhead of the remaining components of said mixture, which comprises initially cooling a compressed feed gas mixture of said components, dividing said cooled compressed feed mixture into a first portion and a remaining portion, passing said first portion of said cooled compressed feed mixture along the lower portion of a distillation column in heat exchange relation with the contents or fluid of said lower portion of said column at a plurality of multiplicity of levels, said first portion of the feed mixture being further cooled by the contents of said column and providing reboil heat to the lower portion of said column, withdrawing said further cooled first portion of the feed mixture from heat exchange relation with the contents of the lower portion of said column, additionally cooling said further cooled first portion of feed mixture by external refrigeration, passing said additionally cooled portion of feed mixture along the upper portion of said distillation column in heat exchange relation with the contents or fluid of said upper portion of said column at a plurality or multiplicity of levels, said last-mentioned portion of feed mixture being further cooled by the contents of said column and providing reboil heat to the upper portion of said column, withdrawing said last-mentioned further cooled portion of feed mixture in liquid form from heat exchange relation with the contents of the upper portion of said column, further cooling said remaining portion of said cooled compressed feed mixture, combining said further cooled remaining portion of said feed mixture with said additionally cooled liquid feed mixture withdrawn from heat exchange relation with the contents of the upper portion of said column, introducing the resulting combined cooled feed mixture into the top of said column as feed for said column, effecting a separation of said feed mixture in said column by a non-adiabatic distillation in said column, withdrawing a liquid bottoms product consisting essentially of the highest boiling point components of said feed mixture and withdrawing an overhead product of the remaining components in said feed mixture.

In preferred procedure, the remaining portion of the cooled compressed feed mixture, after further cooling, is divided into a second portion and a third portion, the further cooled second portion of the feed mixture is combined with the first portion of the feed mixture withdrawn from heat exchange relation with the contents of the lower portion of the column, such combined cooled feed mixture is additionally cooled by external refrigeration and passed into heat exchange relation along the upper portion of the distillation column, for further cooling and to provide reboil heat for the column, the third portion of the feed mixture is additionally cooled and combined with the liquid feed mixture withdrawn from heat exchange relation with the contents of the upper portion of the column, and the resulting combined cooled feed mixture then introduced into the top of the column as feed therefor.

As previously noted, the lower boiling components of the feed gas mixture, removed as overhead from the column, e.g., methane, is passed in heat exchange relation with the second and third portions of the feed mixture to provide cooling therefor, and is preferably also passed in heat exchange relation with the initial compressed feed mixture for cooling same, and the liquid bottoms product containing the highest boiling point components of the feed mixture, e.g. ethane, can be subcooled, if desired, by passage thereof in heat exchange relation with the cold column overhead, e.g., methane.

For effecting non-adiabatic distillation in the column and cooling of the feed mixture as described above, the feed mixture can be passed through one or more heat exchangers positioned within and along the lower portion of the column, and through one or more heat exchangers positioned within and along the upper portion of the column, for heat exchange with the vapor-liquid mixture in the column at a plurality of temperature levels in the lower and upper portions thereof, or alternatively such feed mixture can be passed through a plurality of separate heat exchangers positioned externally of and along the respective lower and upper portions of the column, in heat exchange relation with vapor-liquid mixture removed from various temperature levels in the respective lower and upper portions of the column and passed through such separate heat exchangers and the partially vaporized exiting mixtures injected back into the column at a plurality of appropriate temperature levels therein.

Where the column employs the usual plates or trays, the vapor-liquid mixture can be removed from a plurality of such trays, and then injected back into the column at substantially the same or a slightly lower level from which such vapor-liquid mixtures were removed, after passage thereof through the external heat exchangers. In either case, that is, by use of either internal or external heat exchangers, substantial refrigeration of the feed mixture is provided by the contents of the column, with reboil being supplied to the column by the feed mixture along the length of the column.

The present invention is particularly applicable for processing natural gas streams containing methane and sufficient quantities of such heavier hydrocarbons as ethane, propane and butane to warrant their separation and recovery as a separate product. Thus, the invention is particularly designed to sepaarte ethane from natural gas mixtures containing a major proportion of methane, e.g., about 70 to about 95% methane, and a minor proportion of ethane, e.g., about 5 to about 30% ethane, and such natural gas mixtures may contain propane in an amount up to about one half of the proportion of ethane present, e.g., from 0 to about 15% propane and may also contain heavier hydrocarbons such as butane, in an amount less than about 5% of the feed, e.g., from 0 to about 5% of the feed mixture, by weight.

Thus, for example, according to the invention process and system a natural gas consisting of about 85% methane and about 15% ethane can be separated into two fractions, one containing about 98% methane and the other containing about 99.5% ethane. According to the invention, a high recovery of the order of 85% of the ethane present in the feed mixture can be recovered as substantially pure ethane efficiently with low power requirement. An illustrative process for producing such results according to the invention is described below in connection with the accompanying drawing wherein:

FIG. 1 is a schematic representation of a preferred form of a separation system according to the invention; and FIG. 2 illustrates an alternative means for exchanging heat between the column contents and the feed stream.

Referring to FIG. 1 of the drawing, a natural feed gas mixture is provided at 10, such feed mixture consisting of 85% methane and 15% ethane. Such feed mixture is furnished at ambient temperature at a pressure of 200 p.s.i.a It is desired in the instant embodiment, to return the methane product stream at 200 p.s.i.a. and to furnish the ethane product as a subcooled liquid.

The above exemplary natural gas feed mixture 10 is compressed at 12 to 300 p.s.i.a and cooled by passage through water cooler 14 to approximately 540° R. (Rankine). The resulting cooled feed mixture at 16 is then further cooled by passage through coil 18 of regenerator 20 by heat exchange with out-going methane product passing through coil 22. The resulting feed mixture 24 at a temperature of 480° R. is then split into two streams 26 and 28, the stream 26 containing approximately 54% of the feed mixture.

The first feed stream 26 is then introduced into one or more passages 30 of a heat exchanger construction (not shown) positioned lengthwise in the lower portion of a distillation column 32 containing the conventional trays 34, and is passed through the passages 30 in heat exchange relation with the contents of the lower portion of the column. The feed mixture entering the passages 30 is at a temperature above the temperature of the contents in the bottom of the column, and during passage of the feed mixture through such passages 30, the adjacent lower portion of the column is heated along its length at several temperature levels, and the feed stream is cooled along the length of the heat exchanger passages 30, to temperatures well below the contents at the bottom of the column. Thus, the feed stream is removed from the column heat exchanger passages 30, at 36 at a temperature of approximately 372° R. as compared to the temperature of 405° R. in the bottom of the column.

The remaining feed stream 28, comprising 46% of the feed, is cooled by passage through coil 38 of a heat exchanger 40 against overhead methane product passing through coil 42 of the heat exchanger 40, and the exiting cooled feed mixture stream at 46, at a temperature of 372° R. is then split into two streams 48 and 50.

The stream 48, comprising 31% of the feed, is mixed or combined at 51 with the major portion of the feed stream initially cooled in the passages 30 of the heat exchanger in the column. The other feed stream 50 comprising 15% of the feed, is further cooled by passage through coil 52 of a heat exchanger 54 in heat exchange relation with overhead methane passing through coil 56, the resulting subcooled feed stream 58 being at a temperature of 295° F. and being completely condensed.

The combined feed stream at 60 containing 85% of the feed is cooled by passage through coil 62 of a heat exchanger 64 by an external refrigerant such as throttled liquid ethylene at 66, passed through coil 68 of the heat exchanger. The exiting feed stream at 70 at a temperature of 340° R. is then passed through passages 72 of a heat exchanger construction (not shown) positioned lengthwise in the upper portion of the fractionating column 32, the temperature of the feed stream 70 being higher than the temperature of the contents of the upper portion of the column. Thus, during passage through the heat exchanger passages 72 the feed stream is again cooled by the column along the length of the heat exchanger passages 72, providing additional reboil heat in the column, the exiting cooled feed stream at 74 now being in liquid form and at a temperature of 295° R.

Both of the feed streams 74 and 58 are combined at 76 and throttled at 78 to a reduced pressure of 200 p.s.i.a., the operating pressure in column 32, and to a reduced temperature of about 290° R. The resulting throttled feed mixture is then introduced at 80 into the top of the distillation column 32. In the distillation column such feed is separated into an overhead 82 containing about 98% methane, and a liquid bottoms product at 84, containing about 99.5% ethane, both the overhead methane and the bottom liquid ethane being at a pressure of about 200 p.s.i. The amount of liquid ethane product recovered at 84 consists of about 85% of the total ethane in the initial feed mixture at 10, corresponding to a high recovery of ethane from such natural gas feed as compared to prior art processes.

As previously noted, the compressed cooled feed passing through the heat exchange passages 30 in the bottom of column 32 and the further cooled compressed feed passing through heat exchange passages 72 along the upper portion of the column provide for addition of heat to both the lower and upper portions of the column, and refrigeration of the feed at different temperature levels both in the lower and upper portions of the column, allowing column refrigeration to be available to the feed at temperatures sufficiently low to permit efficient cooling of the feed passing through the heat exchanger passages 30 and 72, and effecting a non-adiabatic distillation in the column. Such heat exchange takes place at a multiplicity of points along the length of passages 30 and of passages 72. It will be noted that the entire column 32 functions as a stripping column, with the finally cooled throttled liquid-vapor feed mixture at 80 introduced into the top of the column being sufficiently cooled to prevent excessive ethane being carried out as vapor into the overhead methane.

The external refrigeration provided at 66 in heat exchanger 64 can be supplied by any conventional means such as a gas cooled by expansion in a turbine, e.g., expanded nitrogen or methane, or by throttling a high pressure liquid such as liquid ethylene or ethane, and evaporating it in the coil 68.

The overhead methane at 82 is first passed through coil 56 of heat exchanger 54 for cooling feed stream 50 at 52; is then passed through coil 42 of heat exchanger 40 for cooling the feed stream 28 at 38 and is finally passed through coil 22 of heat exchanger 20 for cooling the initial natural gas feed stream at 16 passing through coil 18; and is recovered as methane product at 86, at a pressure of 200 p.s.i.a.

The liquid ethane bottoms product 84 at a temperature of 405° R. is then subcooled by passage through coil 88 of heat exchanger 40 against overhead cold methane vapor at 42, and the exiting subcooled liquid ethane at 90, at 360° R. can be recovered as product at 200 p.s.i.a., or the latter liquid can be throttled at 92 to 15 p.s.i.a. to furnish completely liquefied ethane product.

An essential feature of the invention, as illustrated by the above-described specific embodiment, is that only a small portion of refrigeration available from the column is removed at the bottom temperature of 405° R. in the column. The remaining major portion of refrigeration is removed from the column at several levels both at the bottom and top of the column, at temperatures varying between the bottom temperature of 405° R. and the temperature at the top of the column of 290° R., with approximately 70% of the column refrigeration removed at temperatures between about 340° R. and 290° R., that is, essentially between the bottom and top of the heat exchange passages 72 in the upper portion of the column. Only an additional minor portion of cooling of the feed mixture is required by the external refrigerant at 68 and by the overhead methane product at 56, 42 and 22.

On the other hand, in a conventional adiabatic fractionation column for separation of the same natural gas mixture, refrigeration would be available only at the bottom temperature of the column and substantially more refrigeration work would be required to cool the feed stream. Thus, the work required for the procedure and cycle described above and illustrated in FIG. 1 for separating the above-noted natural gas mixture containing 85% methane and 15% ethane is approximately 14,500 B.t.u. per mole of feed, whereas in a conventional adiabatic process 27,000 B.t.u. per mole of feed would be required.

The heat exchangers or constructions containing the heat exchange passages 30 and 72 shown in FIG. 1, for passage of the compressed feed mixture into indirect heat exchange relation with the lower and upper portions of column 32, can be in the form of any suitable heat exchanger constructions, and the column additionally contains the above-noted conventional trays or bubble plates 34 or equivalent members conventionally employed in distillation columns in the art.

Alternatively, the passages or constructions embodying heat exchange passages 30 and 72 can be in the form of a unitary plate-fin heat exchanger (not shown), wherein the passages or channels 30 and 72 for the feed are arranged in indirect heat exchange relation with passages or channels bearing the liquid-vapor natural gas mixture being separated in the column 32, such channels in the column being constructed in the manner of a series of perforated fins producing the effect of distillation column trays. This is a known type of heat exchanger arrangement described in International Advances in Cryogenics, volume 10, 1965, and in "Compact Heat Exchangers," London and Kays, McGraw-Hill Co., New York. Since such heat exchanger arrangements or constructions per se form no part of the present invention, they are not shown herein.

As illustrated in FIG. 2 of the drawing instead of passing the feed in a continuous manner through the lower and upper portions of the column in indirect heat exchange relation with the column contents, as indicated at 30 and 72, heat may be exchanged between the column and the feed streams 26 and 70 by removing liquid from various trays 34 at a multiplicity of temperature levels both in the lower and upper portions of the column 32, as indicated at 100, and partially evaporating such liquid by passage through coils 102 of a series of external heat exchangers 104 and 104' positioned in vertically spaced relation along the lower and upper portions, respectively, of the column, in heat exchange relation with the feed passing through coils 106 of such heat exchangers, the vapor-liquid mixture exiting coils 102 then being injected back into the column at substantially the same tray level from which the respective liquids were withdrawn, as indicated at 108, thus providing boilup in the lower portion of the column, and reflux in the upper portion of the column. Thus, in FIG. 2, the feed stream is also cooled at a multiplicity of points or stages along the length of the column, by refrigeration supplied from the column non-adiabatically, as in the case of the column embodiment shown in FIG. 1.

Hence, the expression passing the feed mixture in heat exchange relation "along" the lower portion and "along" the upper portion of the distillation column, as employed herein, is meant to cover the embodiments of both FIGS. 1 and 2, and denote passage of the feed stream in heat exchange relation with the contents of the column at a multiplicity of temperature levels along the column, regardless as to whether the feed stream is introduced into a heat exchanger positioned internally in the column for heat exchange therewith, or is passed externally of the column through several external heat exchangers in heat exchange relation with the liquid contents removed from various levels within the column and returned thereto, as in FIG. 2.

Although in FIG. 2, three external heat exchangers are shown in the lower portion of the column, and three such heat exchangers in the upper portion of the column, with three corresponding column liquid removal and injection points in the respective lower and upper portions of the column, if desired, more or less than three such heat exchangers and liquid removal and injection points in the lower and upper portions, respectively, of the column can be employed, with the effect of increasing or decreasing the approach to complete reversibility, the greater the number of said heat exchangers and liquid removal and injection points, the closer the approach to reversibility. Further, if desired, combinations of internal and external heat exchangers can be employed, e.g., an internal heat exchanger construction as indicated at 30 in FIG. 1 can be employed in the lower portion of the column, and a plurality of external heat exchangers as indicated at 104' in FIG. 2, in the upper portion of the column; or an internal heat exchanger as indicated at 72 in FIG. 1 in the upper portion of the column and a plurality of external heat exchangers as indicated at 104 in FIG. 2, in the lower portion of the column.

From the foregoing, it is seen that the invention provides a process and system for the separation of the components of a gas mixture, and designed particularly for the separation of hydrocarbons, especially for separation of ethane and methane from natural gas consisting essentially of these two components, with high efficiency, by recovery of a major portion of the refrigeration within the distillation column at relatively low temperatures throughout the length of the column, and effecting a non-adiabatic distillation, resulting in substantial reduction in power and heat exchanger requirements.

The process and system of the invention can also be employed for separating other gas mixtures, such as a mixture of hydrogen, methane, ethylene, ethane and heavier hydrocarbons into a light fraction containing hydrogen and methane with a small amount of ethylene and a heavy fraction containing ethylene, ethane and heavier hydrocarbons.

While we have described particular embodiments of our invention for the purpose of illustration, it should be understood that various additional modifications and adaptations thereof may be made within the spirit of the invention, and hence the invention is not to be taken as limited except by the scope of the appended claims.

We claim:

1. A process for separating the components of a gas mixture having different boiling points, by low temperature rectification, to produce a bottoms product consisting essentially of the highest boiling point components of said mixture and an overhead of the remaining components of said mixture, which comprises initially cooling a compressed feed gas mixture of said components, dividing said cooled compressed feed mixture into a first portion and a remaining portion, passing said first portion of said cooled compressed feed mixture along the lower portion of a distillation column in indirect heat exchange relation with the contents of said lower portion of said column at a plurality of levels, said first portion of the feed mixture being further cooled by the contents of said column and providing reboil heat to the lower portion of said column, withdrawing said further cooled first portion of the feed mixture from indirect heat exchange relation with the contents of the lower portion of said column, additionally cooling said further cooled first portion of feed mixture by external refrigeration, passing said additionally cooled portion of feed mixture along the upper portion of said distillation column in indirect heat exchange relation with the contents of said upper portion of said column at a plurality of levels, said last-mentioned portion of feed mixture being further cooled by the contents of said column and providing reboil heat to the upper portion of said column, thereby removing refrigeration from the column at a plurality of different temperature levels both along the lower and along the upper portions of said column, and utilizing such refrigeration for cooling said further cooled first portion and said additionally cooled portion of said feed mixture both along the lower and upper portions of said column, withdrawing said last-mentioned further cooled portion of feed mixture in liquid form from indirect heat exchange relation with the contents of the upper portion of said column, further cooling said remaining portion of said cooled compressed feed mixture, combining said further cooled remaining portion of said feed mixture with said additionally cooled liquid feed mixture withdrawn from indirect heat exchange relation with the contents of the upper portion of said column, introducing the resulting combined cooled feed mixture into the top of said column as feed for said column, effecting a separation of said feed mixture in said column by a non-adiabatic distillation in said column, withdrawing a liquid bottoms product consisting essentially of the highest boiling point components of said feed mixture and withdrawing an overhead product of the remaining components in said feed mixture.

2. A process as defined in claim 1, wherein said first portion of said cooled compressed feed mixture is passed along and through said lower portion of the distillation column in indirect heat exchange relation with the contents of said lower portion of said column, and wherein said additionally cooled portion of feed mixture is passed along and through the upper portion of said distillation column in indirect heat exchange relation with the contents of said upper portion of said column.

3. A process as defined in claim 1, wherein said first portion of said cooled compressed feed mixture is passed along the lower portion of said distillation column externally of said column, in indirect heat exchange relation with liquid removed from a plurality of temperature levels within the lower portion of said column, said liquid being partially vaporized during heat exchange relation with said feed, and the resulting vapor-liquid mixtures being introduced back into the column at a plurality of levels therein, and wherein said additionally cooled portion of said feed mixture is passed along the upper portion of said distillation column externally of said column in indirect heat exchange relation with liquid removed from a multiplicity of temperature levels within said upper portion of said column, said liquid being vaporized during said heat exchange relation with said feed mixture, and returned to said column at a plurality of levels therein.

4. A process as defined in claim 1, including dividing said further cooled remaining portion of said cooled compressed feed mixture into a second portion and a third portion, combining said further cooled second portion of said feed mixture with said further cooled first portion of said feed mixture withdrawn from heat exchange relation with the contents of the lower portion of said column, prior to additionally cooling said further cooled first portion of said feed mixture by external refrigeration, further cooling said third portion of said feed mixture and combining said further cooled third portion of said feed mixture with said feed mixture withdrawn from heat exchange relation with the contents of the upper portion of said column, prior to introducing said resulting combined cooled feed mixture into the top of said column.

5. A process as defined in claim 1, wherein said distillation column is operated at a pressure lower than the pressure of said compressed feed gas mixture, and wherein said combined cooled feed mixture is throttled to column pressure prior to introduction of said combined cooled feed mixture into the upper portion of said column.

6. A process as defined in claim 1, including passing said cold overhead product in heat exchange relation with said remaining portion of said cooled compressed feed mixture for further cooling same, and passing the exiting overhead in heat exchange relation with said compressed feed gas mixture for initially cooling same.

7. A process as defined in claim 1, including passing said liquid bottoms product into heat exchange relation with said cold overhead product, for subcooling said liquid bottoms product.

8. A process as defined in claim 4, including passing said cold overhead product in heat exchange relation with said third portion of said cooled compressed feed mixture for further cooling same, passing the exiting overhead product in heat exchange relation with said remaining portion of said cooled compressed feed mixture for further cooling same, and passing said exiting overhead product in heat exchange relation with said compressed feed gas mixture for initially cooling same, and including passing said liquid bottoms product in heat exchange relation with said overhead product for subcooling said liquid bottoms product.

9. A process as defined in claim 1, wherein said feed gas mixture consists essentially of a mixture of hydrocarbons containing from 1 to about 4 carbon atoms having different boiling points.

10. A process as defined in claim 1, wherein said feed gas mixture is a natural gas containing a major proportion of methane and a minor proportion of ethane.

11. A process as defined in claim 1, wherein said feed gas mixture is natural gas containing about 70 to about 95% methane, about 5 to about 30% ethane, 0 to about 15% propane, and 0 to about 5% heavier hydrocarbons, said liquid bottoms product containing chiefly ethane, and said overhead product containing chiefly methane.

12. A process as defined in claim 8, wherein said feed gas mixture is natural gas containing about 70 to about 95% methane, about 5 to about 30% ethane, 0 to about 15% propane, and 0 to about 5% heavier hydrocarbons, said liquid bottoms product containing chiefly ethane, and said overhead product containing chiefly methane.

13. A process as defined in claim 8, wherein said feed gas mixture is natural gas consisting essentially of about 85% methane and about 15% ethane, said liquid bottoms product being substantially pure ethane, and said overhead product containing chiefly methane.

14. A system for separating the components of a gas mixture having different boiling points, by low temperature rectification, to produce a bottoms product consisting essentially of the highest boiling point components of said mixture and an overhead of the remaining components of said mixture, which comprises means for initially cooling a compressed feed gas mixture of said components, means for dividing said cooled compressed feed mixture into a first portion and a remaining portion, a distillation column, first heat exchange means for passing said first portion of said cooled compressed feed mixture along the lower portion of said distillation column in indirect heat exchange relation with the contents of said lower portion of said column at a plurality of levels, for further cooling said first portion of the feed mixture, means for withdrawing said further cooled first portion of the feed mixture from said first heat exchange means, means for additionally cooling said further cooled first portion of said feed mixture by external refrigeration, second heat exchange means for passing said additionally cooled portion of feed mixture along the upper portion of said distillation column in indirect heat exchange relation with the contents of said upper portion of said column at a plurality of levels, means for withdrawing said last-mentioned further cooled portion of feed mixture in liquid form from said second heat exchange means, means for further cooling said remaining portion of said cooled compressed feed mixture, means for combining said further cooled remaining portion of said feed mixture with said additionally cooled feed mixture withdrawn from said second heat exchange means, means for introducing the resulting combined cooled feed mixture into the top of said column as feed for said column and effecting a separation of said feed mixture in said column by a nonadiabatic distillation in said column, means for withdrawing a liquid bottoms product consisting essentially of the highest boiling components of said feed mixture and means for withdrawing an overhead product of the remaining components in said feed mixture.

15. A system as defined in claim 14, wherein said first heat exchange means is positioned internally within said lower portion of the distillation column, and wherein said second heat exchange means is positioned internally within said upper portion of said distillation column.

16. A system as defined in claim 14, wherein said first heat exchange means comprises a plurality of heat exchangers positioned in vertically spaced relation along the lower portion of said distillation column externally of said column, means for removing liquid from a plurality of temperature levels within the lower portion of said column and introducing said liquid into said respective external heat exchangers in indirect heat exchange relation with said cooled compressed feed mixture, and means for introducing the resulting exiting vapor-liquid mixtures from said heat exchangers back into the column at a plurality of levels therein, and wherein said second heat exchange means comprises a plurality of heat exchangers positioned in vertically spaced relation along the upper portion of said distillation column externally of said column, means for removing liquid from a plurality of temperature levels within said upper portion of said column, and introducing said liquid into said respective last mentioned heat exchangers in indirect heat exchange relation with said additionally cooled portion of said feed mixture, and means for introducing the exiting vapor-liquid mixtures from said last-mentioned heat exchangers into said column at a plurality of levels therein.

17. A system as defined in claim 14, including means for dividing said further cooled remaining portion of said cooled compressed feed mixture into a second portion and a third portion, means for combining said further cooled second portion of said feed mixture with said further cooled first portion of said feed mixture withdrawn from said first heat exchange means, means for further cooling said third portion of said feed mixture, means for combining said further cooled third portion of said feed mixture with said feed mixture withdrawn from said second heat exchange means prior to introduction of said resulting combined cooled feed mixture into the top of said column.

18. A system as defined in claim 14, said means for further cooling said remaining portion of said cooled compressed feed mixture including heat exchange means for passing said cold overhead product in heat exchange relation with said remaining portion of said cooled compressed feed mixture, and said means for initially cooling said compressed feed gas mixture including heat exchange means for passing the overhead exiting said first mentioned heat exchange means in heat exchange relation with said compressed feed gas mixture.

19. A system as defined in claim 14, including heat exchange means for passing said liquid bottoms product into heat exchange relation with said cold overhead product, for subcooling said liquid bottoms product.

References Cited

UNITED STATES PATENTS

| | | | |
|---|---|---|---|
| 950,436 | 2/1910 | Claude | 62—33 |
| 1,460,545 | 7/1923 | Haynes et al. | 62—40 |
| 1,800,353 | 4/1931 | Messer. | |
| 2,086,567 | 7/1937 | McCreery | 62—34 |
| 2,503,265 | 4/1950 | Haynes | 62—28 |
| 2,646,392 | 7/1953 | Gerhold | 202—158 |
| 2,661,608 | 12/1953 | Pavlis | 62—38 |
| 2,677,945 | 5/1954 | Miller | 62—31 |
| 2,713,780 | 7/1955 | Williams | 62—34 |
| 2,713,781 | 7/1955 | Williams | 62—34 |
| 3,258,930 | 7/1966 | Jakob | 62—29 |
| 3,261,168 | 7/1966 | Ruhemann et al. | 62—38 |
| 3,282,060 | 11/1966 | Hays | 62—24 |
| 3,407,614 | 10/1968 | Poska | 62—40 |

WILBUR L. BASCOMB, Jr., Primary Examiner

U.S. Cl. X.R.

62—40; 202—158; 208—351